(12) United States Patent
Suzuki et al.

(10) Patent No.: US 8,767,389 B2
(45) Date of Patent: Jul. 1, 2014

(54) SYSTEM AND EXPANSION APPARATUS

(75) Inventors: Kenji Suzuki, Kawasaki (JP); Yoshiyuki Sando, Kawasaki (JP); Sonomasa Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/216,778

(22) Filed: Aug. 24, 2011

(65) Prior Publication Data
US 2012/0176744 A1 Jul. 12, 2012

(30) Foreign Application Priority Data
Jan. 6, 2011 (JP) ................................. 2011-1309 U (51) Int. Cl.
*G06F 1/16* (2006.01)

(52) U.S. Cl.
USPC .................. 361/679.45; 361/679.41; 710/303

(58) Field of Classification Search
CPC .................................................... G06F 1/1632
USPC ........................... 361/679.4–679.45; 710/303
See application file for complete search history.

(56) References Cited

U.S. PATENT DOCUMENTS

| | | | |
|---|---|---|---|
| 5,483,418 A * | 1/1996 | Hosoi | 361/679.55 |
| 6,222,728 B1 * | 4/2001 | Jaggers et al. | 361/679.41 |
| 6,424,524 B2 * | 7/2002 | Bovio et al. | 361/679.45 |
| 6,717,799 B2 * | 4/2004 | Hamano et al. | 361/679.54 |
| 6,741,462 B2 * | 5/2004 | Kamphuis et al. | 361/679.02 |
| 6,817,588 B2 * | 11/2004 | Tsai | 248/562 |
| 7,061,757 B2 * | 6/2006 | Kuo et al. | 361/679.45 |
| 7,361,064 B2 * | 4/2008 | Chien et al. | 439/824 |
| 8,127,155 B2 * | 2/2012 | Baarman et al. | 713/300 |
| 8,295,039 B2 * | 10/2012 | Cheng et al. | 361/679.26 |
| 2001/0005307 A1 * | 6/2001 | Bovie et al. | 361/686 |
| 2002/0181199 A1 * | 12/2002 | Bovio et al. | 361/686 |
| 2003/0184962 A1 * | 10/2003 | Kambayashi et al. | 361/683 |
| 2005/0026499 A1 * | 2/2005 | Choi | 439/607 |
| 2005/0168937 A1 * | 8/2005 | Yin et al. | 361/686 |
| 2005/0280985 A1 * | 12/2005 | Chen et al. | 361/686 |
| 2005/0286218 A1 * | 12/2005 | Kim | 361/686 |
| 2005/0286219 A1 * | 12/2005 | Kim | 361/686 |
| 2006/0023417 A1 * | 2/2006 | Kuo et al. | 361/686 |

FOREIGN PATENT DOCUMENTS

JP 61-023395 1/1986

* cited by examiner

*Primary Examiner* — Adrian S Wilson
(74) *Attorney, Agent, or Firm* — Fujitsu Patent Center (57) ABSTRACT

A system includes a first apparatus and a second apparatus. The first apparatus includes a first surface, a depression in the first surface, and a first connector disposed on the first surface. The depression has a bottom with a hole through which a screw for assembling the apparatus is passed and accommodates the head of the screw. The second apparatus includes a second surface facing the first surface when the first apparatus is detachably attached, a second connector disposed on the second surface and engaging with the first connector, and a protrusion fixed into the depression when the first apparatus is attached.

19 Claims, 11 Drawing Sheets

SYSTEM AND EXPANSION APPARATUS

CROSS-REFERENCE TO RELATED APPLICATIONS

This application is based upon and claims the benefit of priority from the prior Japanese Patent Application No. 2011-1309 filed on Jan. 6, 2011, the entire contents of which are incorporated herein by reference.

FIELD

This embodiment relates to a system including a first apparatus and a second apparatus.

BACKGROUND

A notebook personal computer (notebook PC) is an example of an electronic apparatus. There is a known detachable expansion apparatus for the notebook PC. Such an expansion apparatus is referred to as, for example, a port replicator, a docking station, or an expansion adaptor. A port replicator increases the number of connectors for connecting the notebook PC and external devices and allows the notebook PC to be carried while keeping cables connected to the external devices.

Notebook PCs of various different types and models are commercially available. Port replicators of various different models matching those of the notebook PCs are also commercially available. Even if a notebook PC and a port replicator allow the use of connectors conforming to the same standard, a notebook PC and a port replicator should not be used in combination if their models do not match. If an unmatching combination of notebook PC and port replicator is used, the notebook PC may not operate normally, and damage due to short-circuiting may be imposed to the internal circuits of the notebook PC.

In the related art, there is a known structure for preventing incorrect insertion and incorrect attachment that includes, for example, a plurality of protrusions attached to the edge section of a printed circuit board and a plurality of engagement holes fitted with these protrusions.

It is, however, not preferable for a notebook PC to have a special structure, such as that in the related art, for preventing incorrect insertion and incorrect attachment. Such a structure limits the design flexibility of the notebook PC.

Such a problem is common for notebook PCs and also various different apparatuses.

SUMMARY

According to an embodiment, a system includes a first apparatus and a second apparatus. The first apparatus includes a first surface, a depression in the first surface, and a first connector disposed on the first surface. The depression has a bottom with a hole through which a screw for assembling the apparatus is passed and accommodates the head of the screw. The second apparatus includes a second surface facing the first surface when the first apparatus is detachably attached, a second connector disposed on the second surface and engaging with the first connector, and a protrusion fixed into the depression when the first apparatus is attached.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

DETAILED DESCRIPTION OF THE EMBODIMENTS

An embodiment will be described below.

Figure 1:
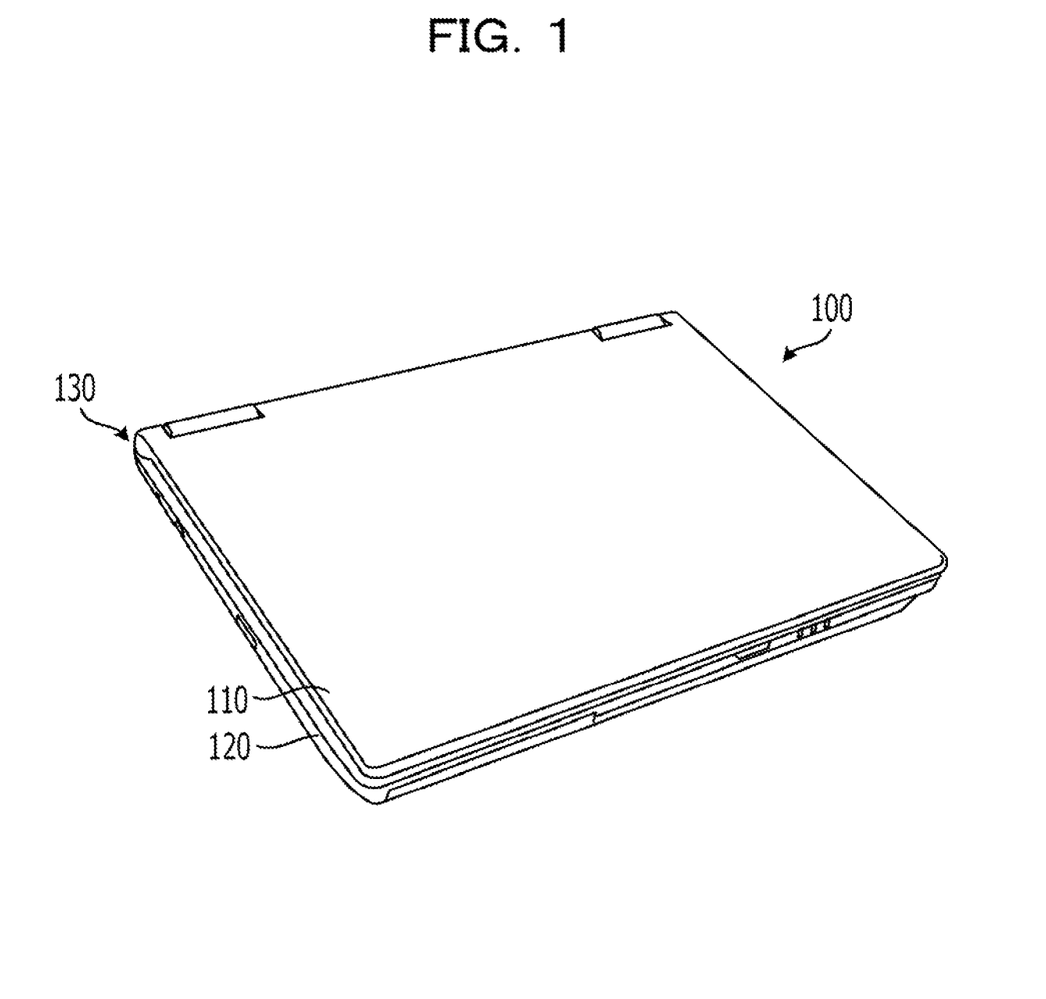
FIG. 1 is a perspective view of a notebook PC in a closed state.
Figure 2:
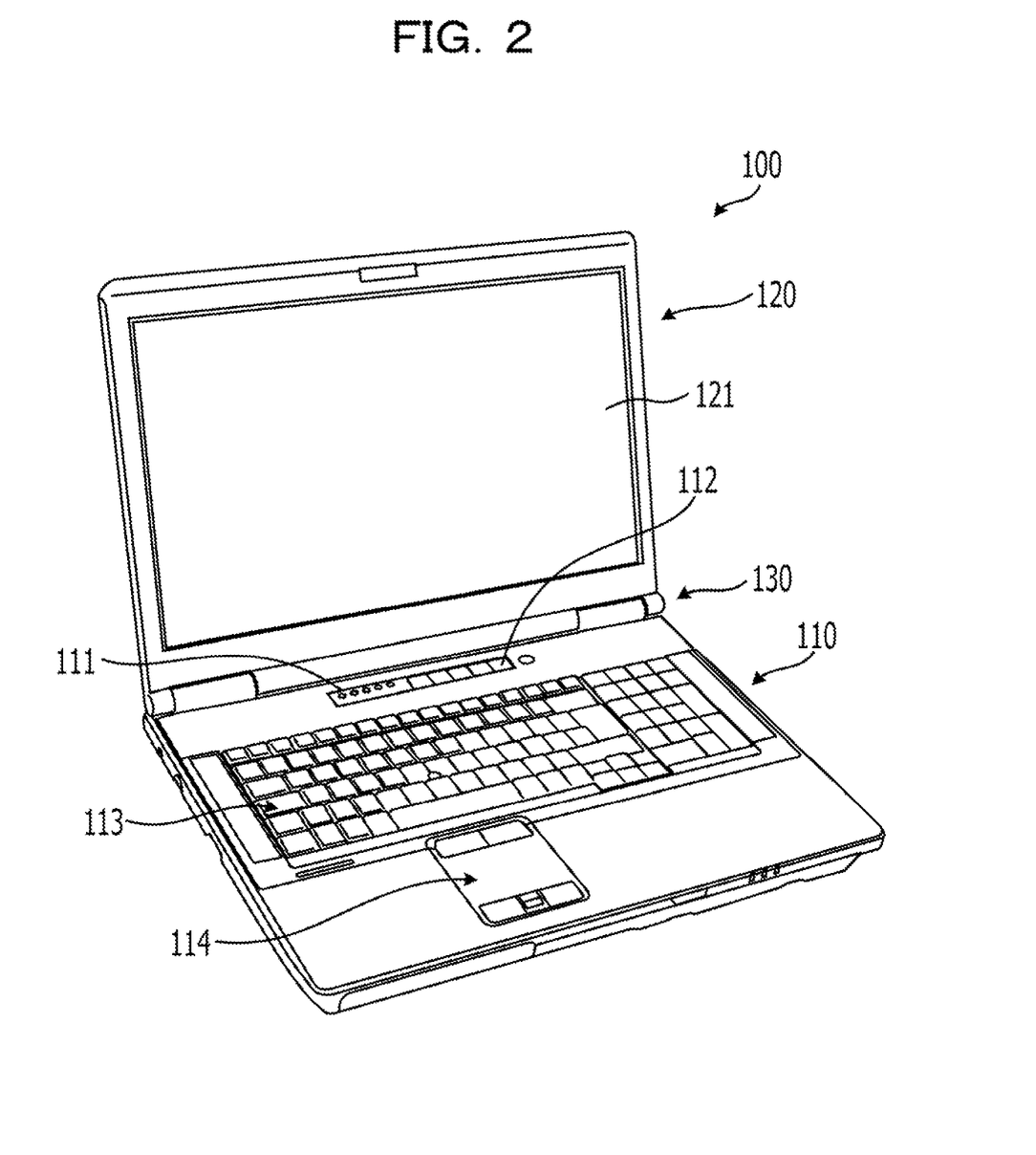
FIG. 2 is a perspective view of a notebook PC in an open state.

FIG. 1 is a perspective view of a notebook PC (Personal Computer) in a closed state. FIG. 2 is a perspective view of a notebook PC in an open state. The notebook PC is an example of a first apparatus or a main apparatus according to the present invention. The notebook PC may otherwise be an example of an electronic apparatus.

The notebook PC 100 includes a main apparatus 110 and a display apparatus 120. The display apparatus 120 is connected to the main apparatus 110 with a hinge 130.

The display apparatus 120 of the notebook PC 100 can be freely opened or closed around the hinge 130. FIG. 1 illustrates a closed state of the display apparatus 120; and FIG. 2 illustrates an open state of the display state.

The upper side of the main apparatus 110 has various indicators 111, various function buttons 112, a keyboard 113, a track pad 114, and so on. The main apparatus 110 accommodates a circuit board. On the circuit board, electronic parts, such as a central processing unit (CPU) (not shown), which is the core of computation, are mounted.

The display apparatus 120 includes a display screen 121. The display screen 121 displays various images in accordance with instructions (signals) from the main apparatus 110.

Figure 3:
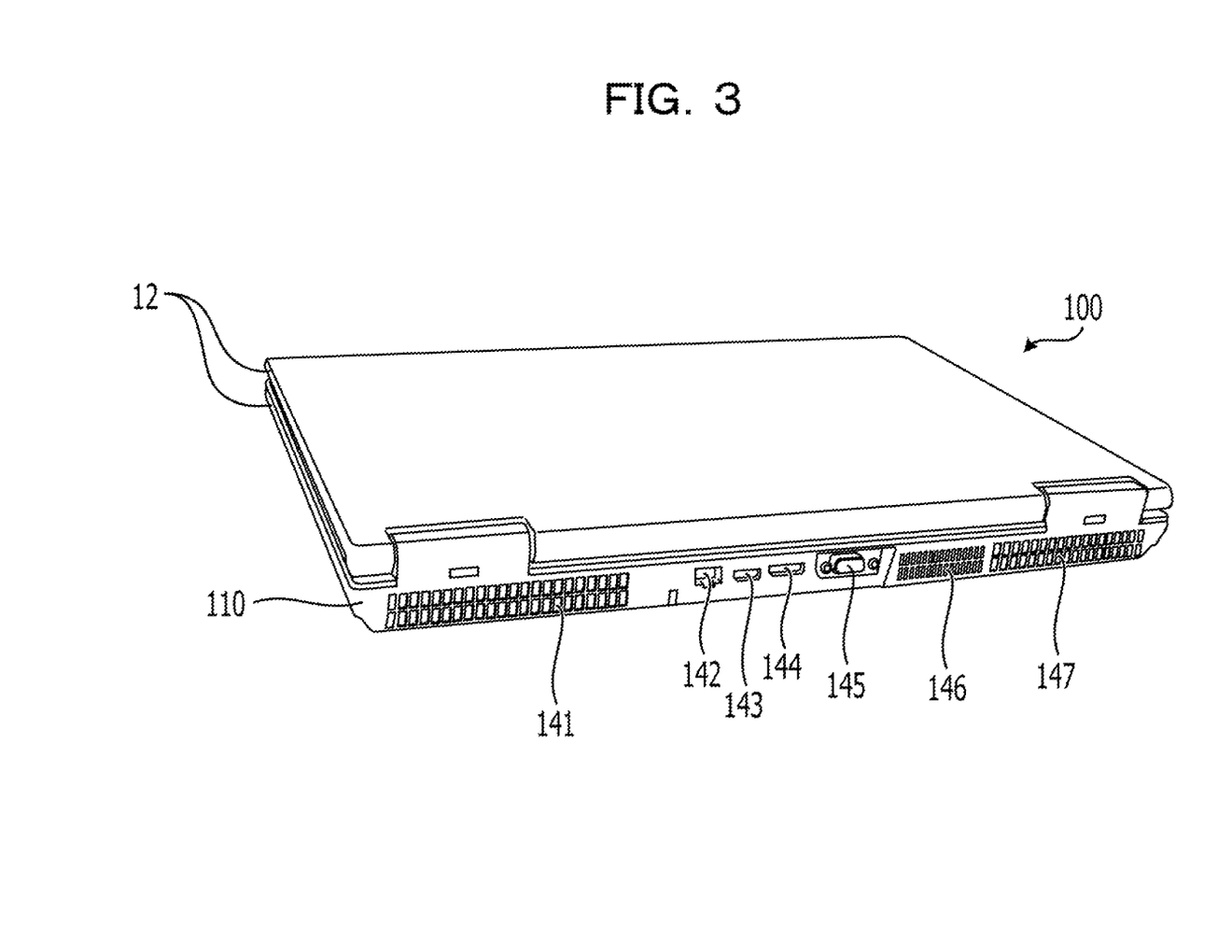
FIG. 3 is a perspective back view of a notebook PC in a closed state.
Figure 4:
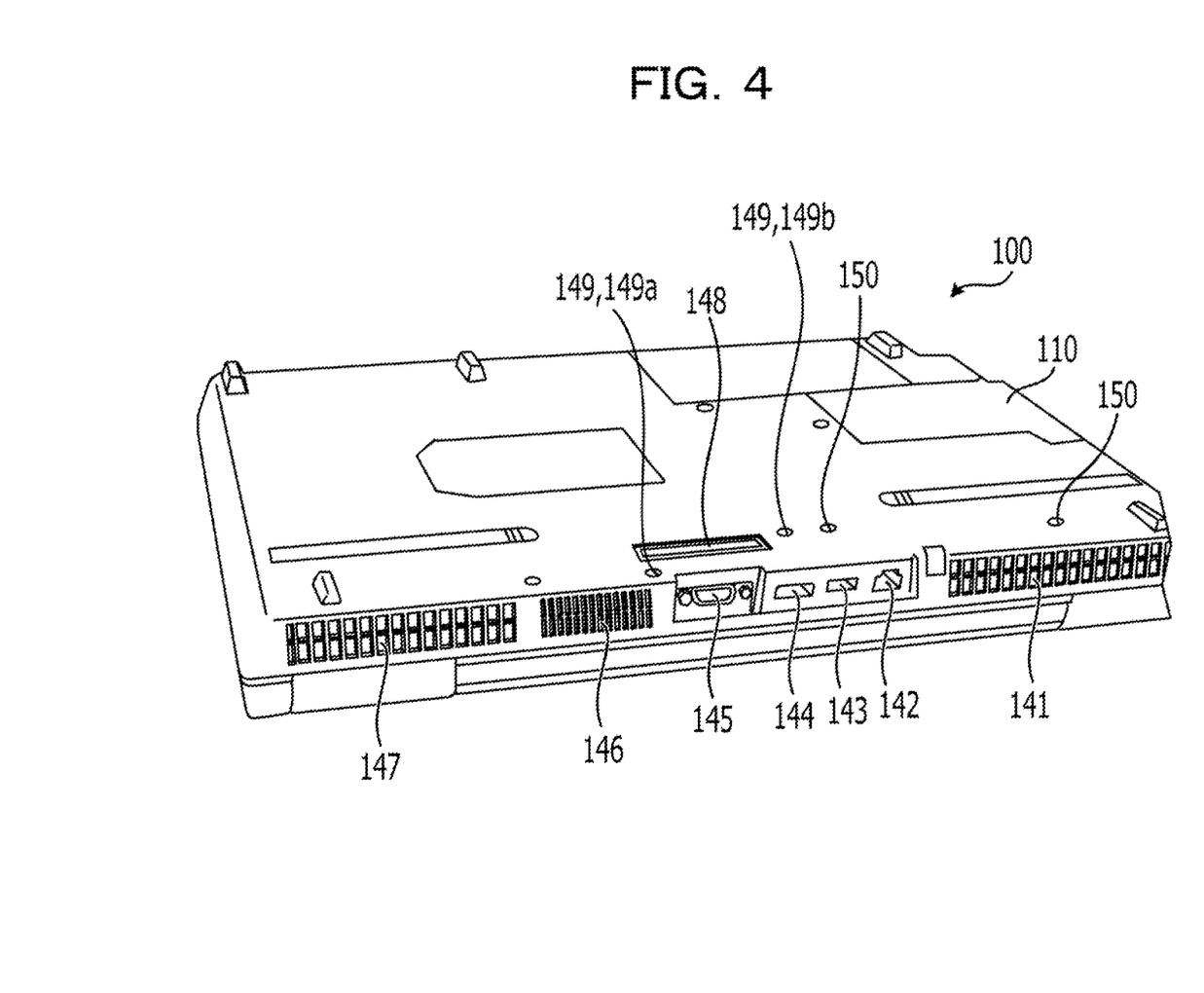
FIG. 4 illustrates the notebook PC in FIG. 3 in an inverted state.

FIG. 3 is a perspective back view of the notebook PC in a closed state. FIG. 4 illustrates the notebook PC in FIG. 3 but in an inverted state.

The back side of the main apparatus 110 of the notebook PC 100 has an exhaust port 141, a LAN port 142, a USB port 143, a display port 144, a VGA connector 145, a suction port 146, and another exhaust port 147.

The bottom side of the main apparatus 110 has a connector 148 for electrical connection with the port replicator, which will be described below. Additionally, the bottom side of the main apparatus 110 has depressions 149, which receive screws (not shown) used for assembly of the main apparatus at positions sandwiching the connector 148 and other positions. By accommodating screws for assembly of the main apparatus 110 in the notebook PC 100, electrostatic discharge caused by contact to the screws is prevented. Such a structure prevents the electronic circuits in the main apparatus 110 from being adversely affected by the electrostatic discharge. The screws may not be exposed on the bottom side of the notebook PC 100 to improve the external appearance. Metal contacts 150 are exposed on the bottom side of the main apparatus 110 to provide a ground electrical potential across main apparatus 110 and the port replicator.

Figure 5:
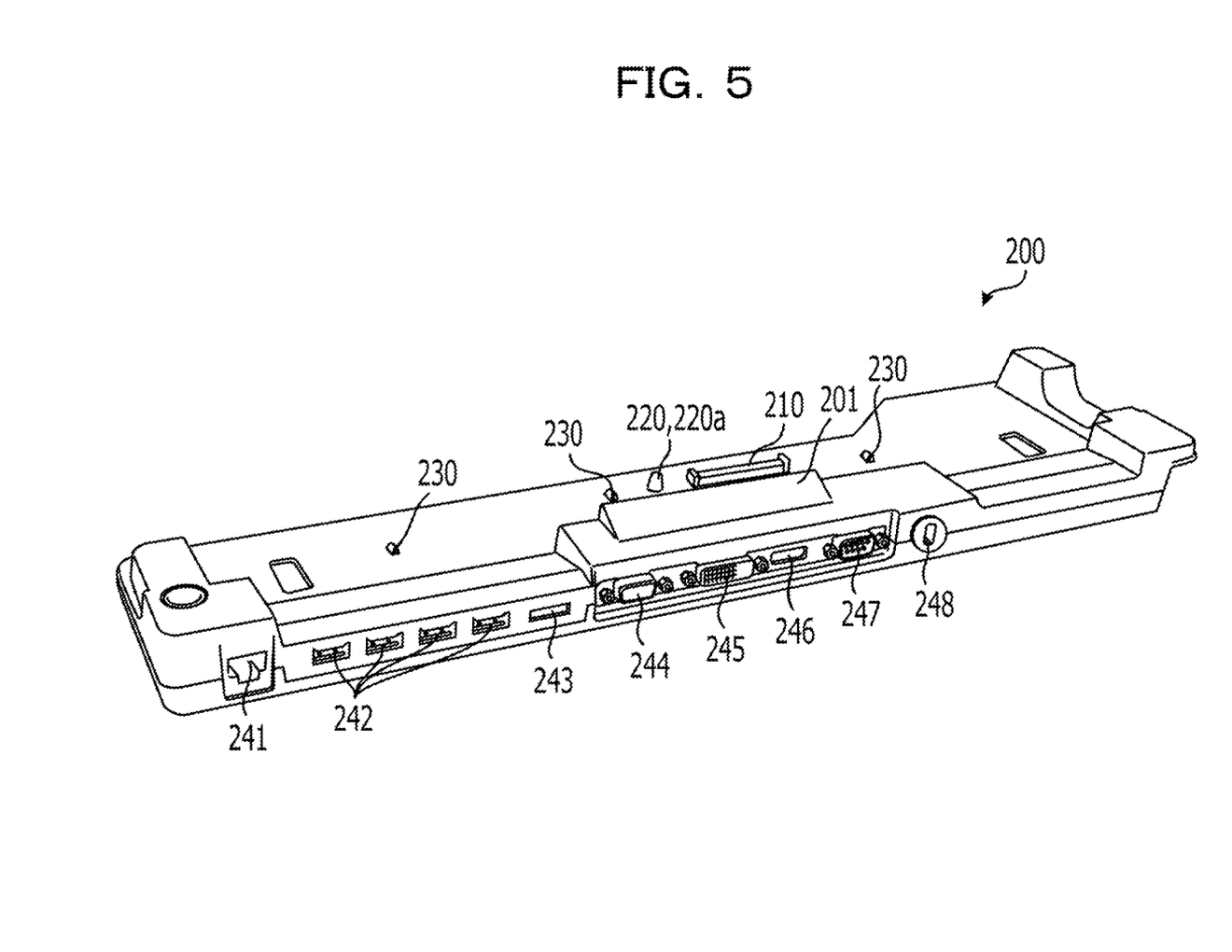
FIG. 5 is a perspective back view of a port replicator.

FIG. 5 is a perspective back view of the port replicator.

The port replicator 200 is detachable from the notebook PC 100. The bottom side of the backward part of the notebook PC, which is illustrated in FIGS. 1 to 3, is placed on the port replicator 200. Accordingly, the port replicator 200 is shaped to fit together with the bottom side of the backward part of the notebook PC. The upper side of the port replicator 200 has a connector 210, which engages with the connector 148 (see FIG. 4) on the bottom side of the notebook PC 100. The upper side of the port replicator 200 faces the bottom side of the notebook PC 100 when the notebook PC 100 is attached. The port replicator 200 has two protrusions 220 near the connector 210 for preventing incorrect connection of the connector. The protrusion 220a illustrated in FIG. 5 is one of the two protrusions 220. The protrusions 220 are inserted into the two protrusions 149a and 149b adjoining the connector 148 on the bottom side of the main apparatus 110. In FIG. 5, the protrusion 220a is inserted into the depression 149a, and the protrusion inserted into the depression 149b is disposed on the upper side of the port replicator 200 but is hidden behind the protruding part 201 and is not visible in the drawing.

The upper side of the port replicator 200 has a plurality of electric contacts 230 protruding upward. The electric contacts 230 provide a common ground potential across the main apparatus 110 and the port replicator 200. The electric contacts 230 contact the metal contacts 150 exposed on the bottom side of the main apparatus 110.

The protruding part 201 of the port replicator 200 covers the connectors on the back side of the main apparatus 110 to prevent the connectors from being used when the notebook PC 100 is attached to the port replicator 200. Part of the upper side of the port replicator 200 is lower than the protruding part 201 so that the exhaust ports 141 and 147 and the suction port 146 (see FIG. 3) of the main apparatus 110 are exposed at the back side of the port replicator 200.

As illustrated in FIG. 5, the back side of the port replicator 200 has a LAN port 241, four USB ports 242, an ESATA port 243, a VGA connector 244, a DVI connector 245, a display port 246, and a serial connector 247. These ports and connectors are wired to the connector 210. The back side of the port replicator 200 also has a lock hole 248.

When the notebook PC 100 is attached to the port replicator 200, instead of the connectors on the notebook PC 100, the connectors on the port replicator 200 are used via the connector 210 and the connector 148.

In this way, a user can detach the notebook PC 100 from the port replicator 200 and carry the notebook PC 100 while keeping the cables connected to the connectors of the port replicators 200.

The embodiment will be described in more detail below.

Figure 6:
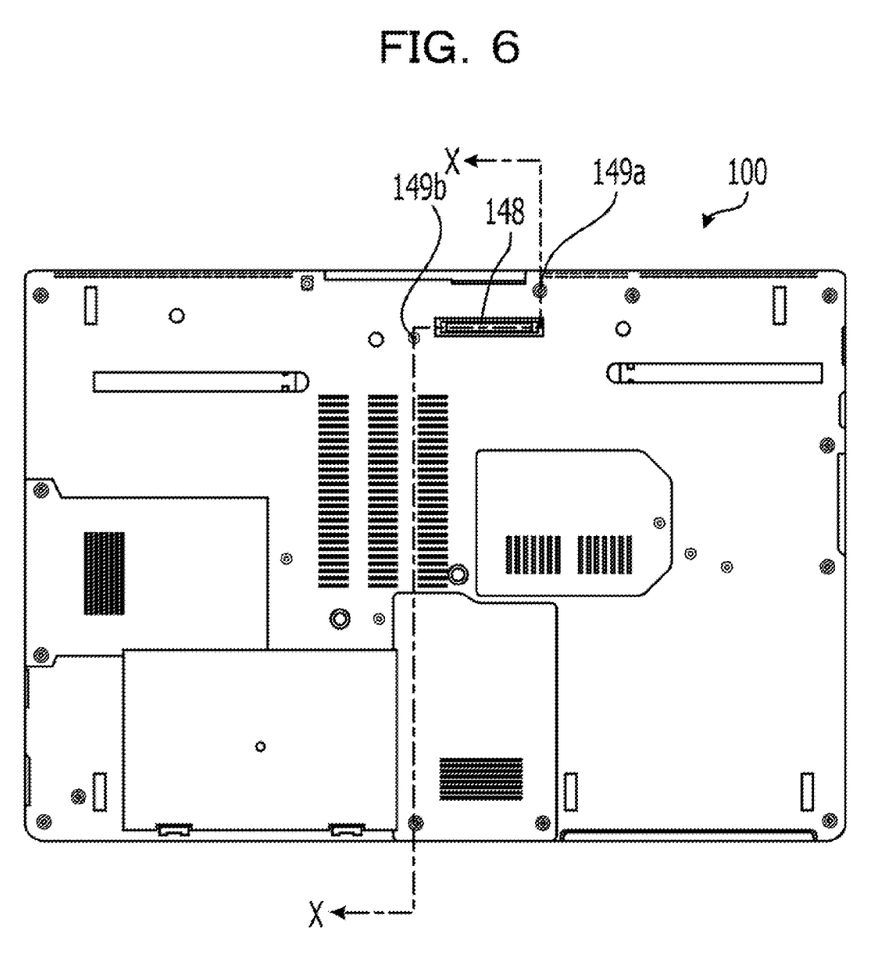
FIG. 6 is a bottom view of a main body of an apparatus.
Figure 7:
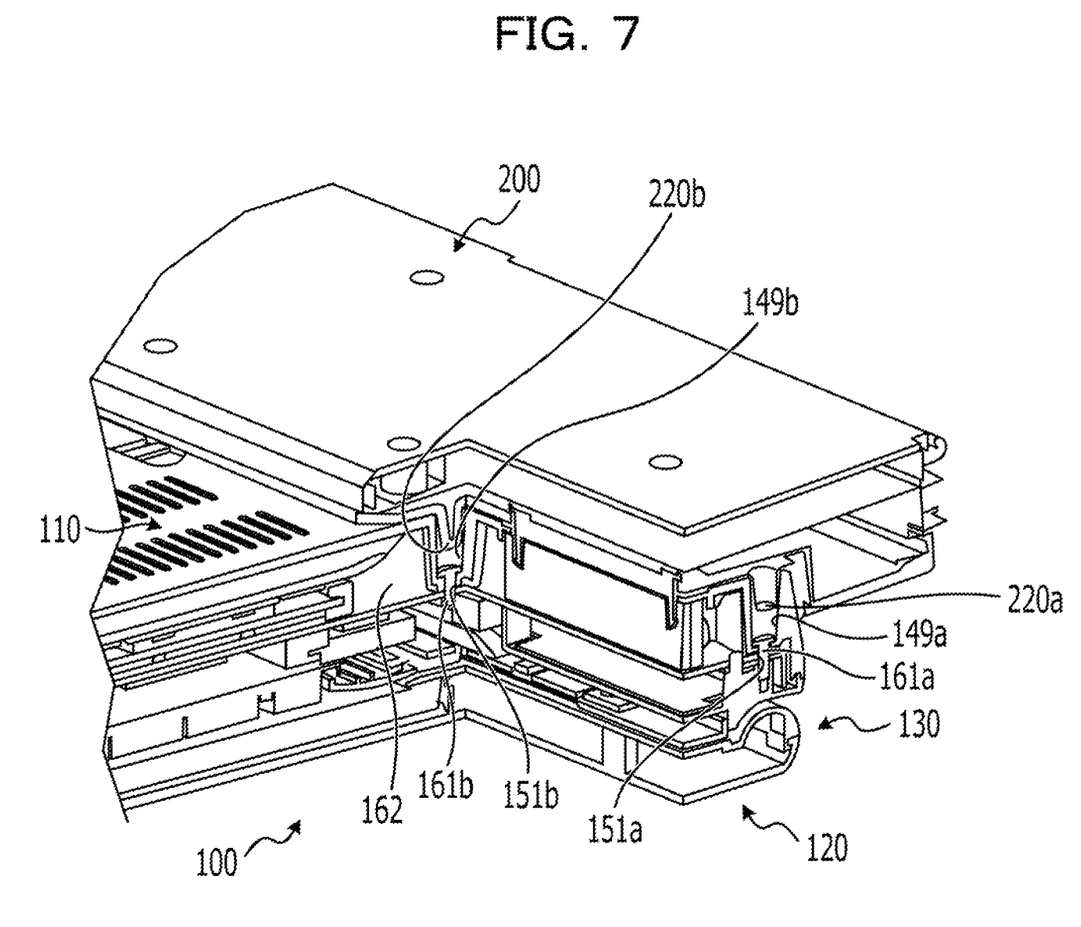
FIG. 7 is a sectional perspective view taken along line X-X in FIG. 6, where a notebook PC is attached to a port replicator.
Figure 8:
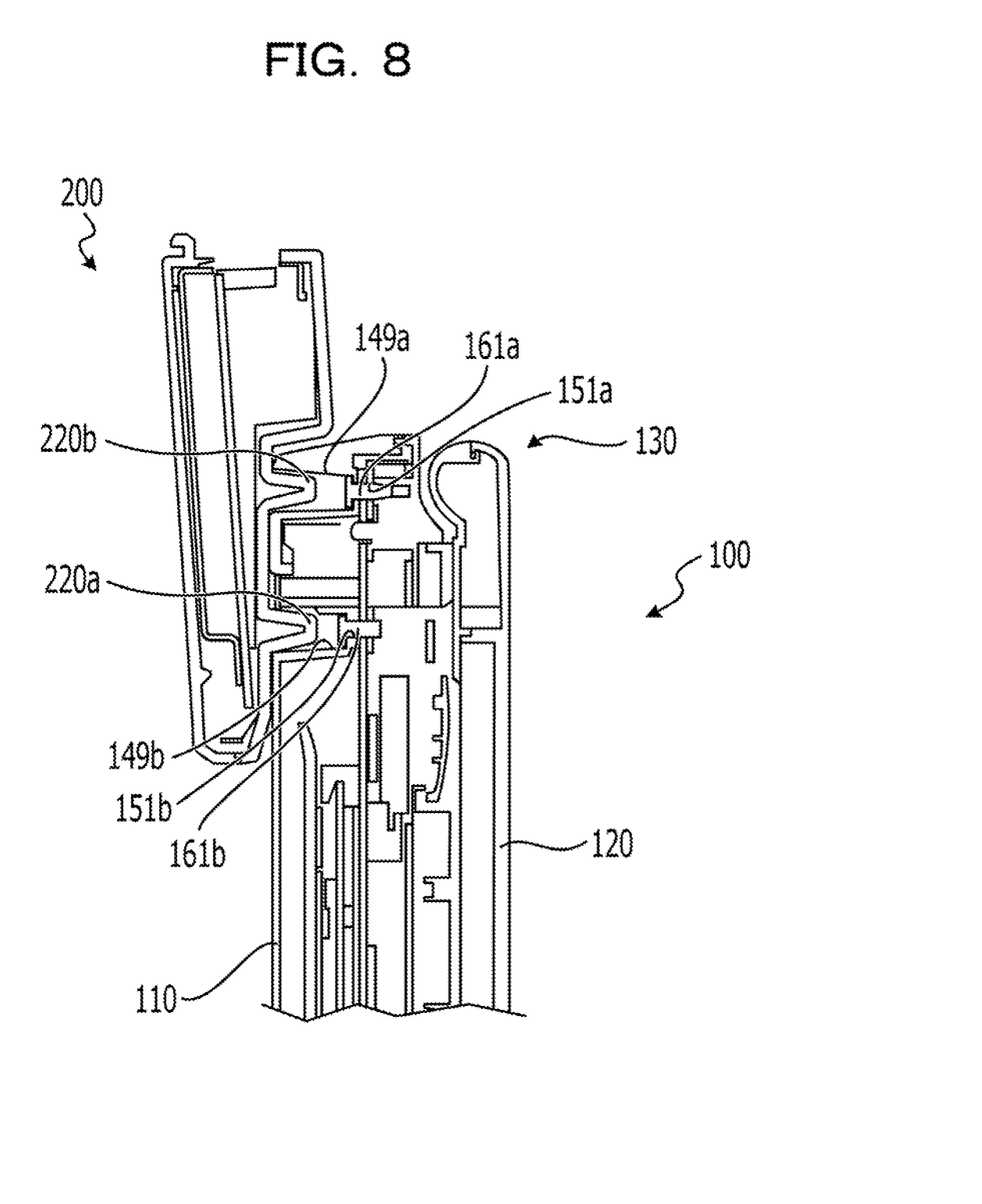
FIG. 8 is a sectional view taken along line X-X in FIG. 6, where the notebook PC is attached to the port replicator.
Figure 9:
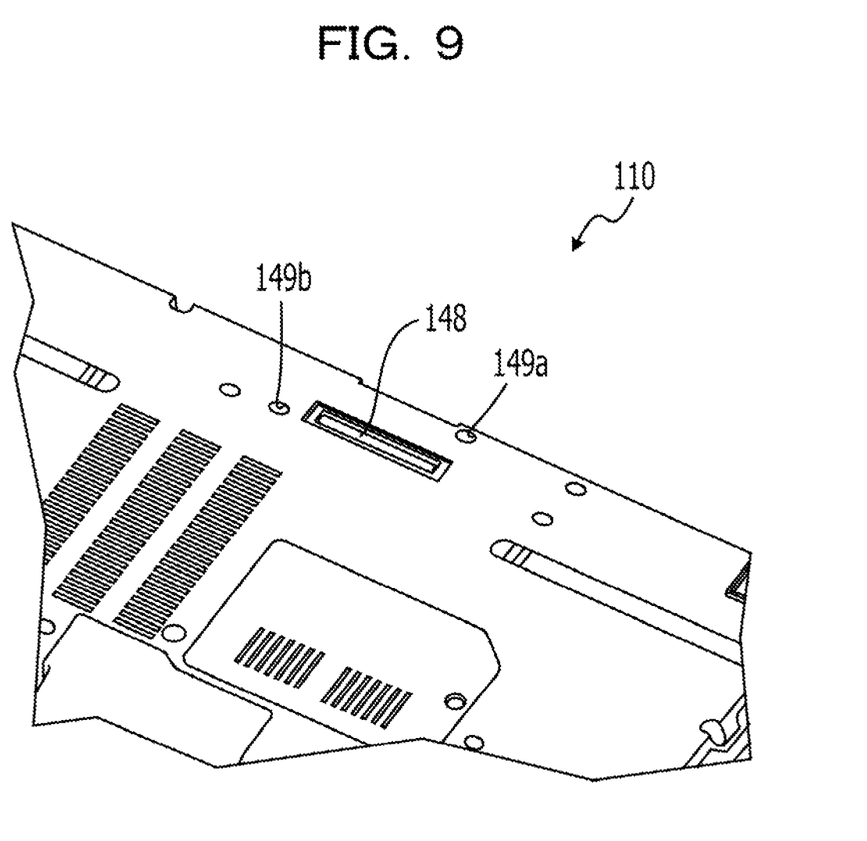
FIG. 9 is a perspective view of part of the bottom side of the main body of the apparatus.
Figure 10:
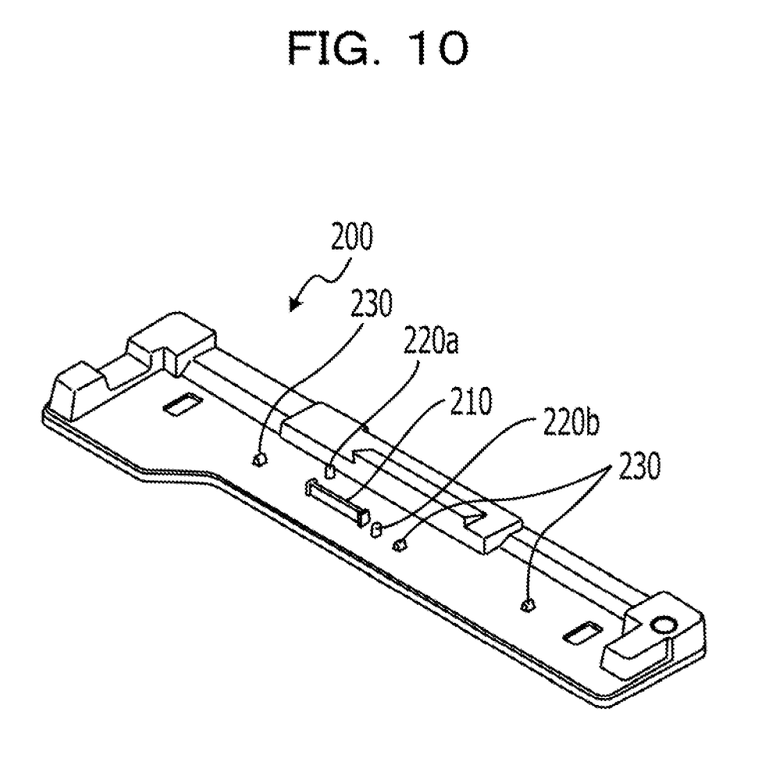
FIG. 10 is a perspective view of a port replicator.
Figure 11:
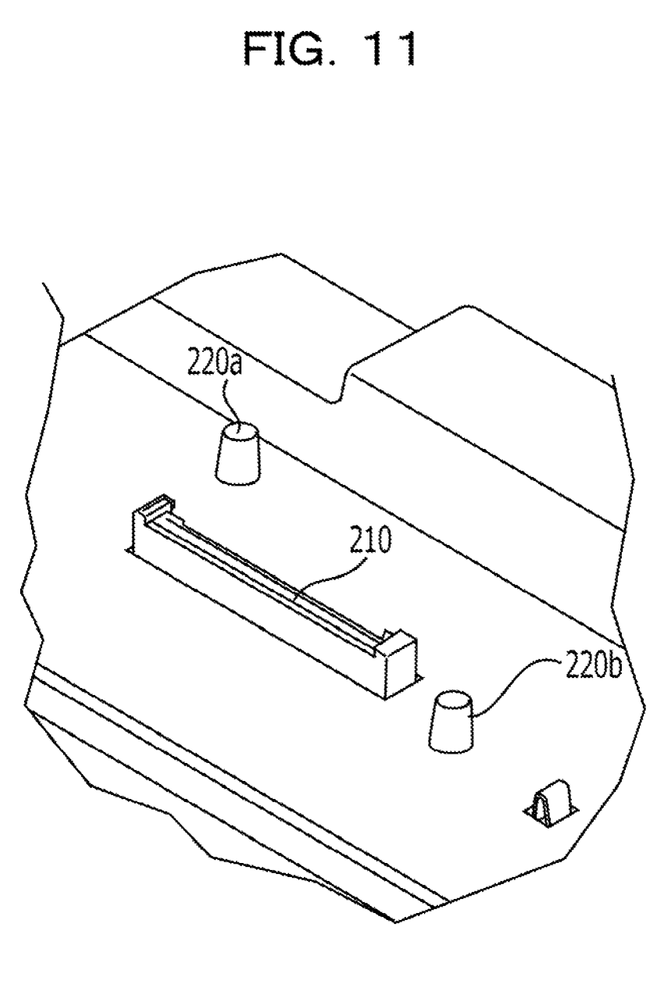
FIG. 11 is an enlarged perspective view of part of the upper side of the port replicator.

FIG. 6 is a bottom view of the main apparatus. FIGS. 7 and 8 are sectional perspective views, taken along line X-X in FIG. 6, of the notebook PC 100 attached to the port replicator 200. FIG. 7 illustrates the port replicator 200 with the bottom surface facing upward. FIG. 9 is a perspective view of part of the bottom side of the main apparatus 110. FIG. 10 is a perspective view of the port replicator 200. FIG. 11 is an enlarged perspective view of part of the upper side of the port replicator 200.

As illustrated in FIGS. 6 and 9, the bottom side of the main apparatus 110 has the connector 148 and the two depressions 149a and 149b. The connector 148 on the bottom side of the main apparatus 110 is interposed between the two depressions 149a and 149b.

As illustrated in FIGS. 7 and 8, screw holes 151a and 151b for screws 161a and 161b, respectively, are formed at the bottoms of the respective depressions 149a and 149b in the main apparatus 110. The screws 161a and 161b secure a circuit board 162 embedded in the main apparatus 110 by being screwed into the holes 151a and 151b. The heads of the screws 161a and 161b securing the circuit board 162 are accommodated in the depressions 149a and 149b, respectively. As described above, this structure prevents the electronic circuit devices (not shown) on the circuit board 162 from being adversely affected by electrostatic discharge caused by contact to the screws and is often used in typical notebook PCs, regardless of the use of the port replicator 200.

The port replicator 200 has the two protrusions 220a and 220b sandwiching the connector 210. The connector 210 engages with the connector 148 (see FIGS. 6 and 9) on the bottom side of the main apparatus 110 of the notebook PC 100 when the notebook PC 100 is attached to the port replicator 200. The two protrusions 220a and 220b are respectively inserted into the two depressions 149a and 149b on the bottom side of the notebook PC 100 when the notebook PC 100 is attached to the port replicator 200, as illustrated in FIGS. 7 and 8.

By positioning the depressions on the bottom side of the notebook PC and the protrusions on the upper side of the port replicator in accordance with the combination of the notebook PC and the port replicator, the protrusions 220a and 220b will collide with the bottom side of the notebook PC if a user tries to attach a notebook PC of a different model to the port replicator 200, even if the notebook PC may happen to have a connector that is the same as the connector 148. In this way, incorrect attachment of a notebook PC and the port replicator 200 can be prevented.

In this embodiment, the main apparatus 110 prevents incorrect attachment of the notebook PC 100 and the port replicator 200 by the depressions 149a and 149b accommodating the screws 161a and 161b, which secure the embedded circuit board 162. Accordingly, incorrect attachment of the notebook PC and the port replicator is prevented without carrying out any special processing or adding any parts to the notebook PC.

As described above, a circuit board is also embedded in the port replicator 200 to wire the various ports and connectors on the back side to the connector 210 on the upper side. The bottom side of the port replicator 200 has depressions accommodating screws, such as those in the main apparatus 110. The circuit board is secured to the port replicator 200 by the screws whose heads are accommodated the depressions. In another embodiment, to prevent incorrect attachment of a notebook PC and a port replicator, screw-accommodating depressions may be formed on the upper side of the port replicator, and protrusions inserted into the depressions may be formed on the main apparatus.

The electronic apparatus may be other computer such as a workstation but the PC. And, the electronic apparatus may be a slate-type computer but the notebook-type computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
    a first apparatus including
        a first surface,
        a depression in the first surface, and
        a first connector disposed on the first surface,
        the depression having a bottom with a hole through which a screw for assembling the first apparatus is passed, the depression accommodating the head of the screw; and
    a second apparatus including
        a second surface facing the first surface when the first apparatus is detachably attached,
        a second connector disposed on the second surface and engaging with the first connector, and
        a protrusion fixed into the depression when the first apparatus is attached,
    wherein the depression has a length from the first surface to the head of the screw which is accommodated in the depression and assembled the first apparatus, the length is longer than a length of the protrusion.

2. The system according to claim 1, wherein
    the depression includes a first depressed part and a second depressed part positioned so as to sandwich the first connector, and
    the protrusion includes a first protruding part and a second protruding part positioned so as to sandwich the second connector, the first protruding part fixed into the first depressed part, and the second protruding part fixed into the second depressed part.

3. The system according to claim 1, wherein the protrusion prevents the second apparatus from being attached to a third apparatus,
    the third apparatus includes a third surface corresponding to the first surface of the first apparatus and a third connector disposed on the third surface corresponding to the first connector of the first apparatus, the third surface does not include other depression corresponding to the depression of the first apparatus that is correspond to the protrusion of the second apparatus.

4. The system according to claim 1, wherein
    the second apparatus further comprises a circuit board that is accommodated in the second apparatus and is secured to the second apparatus.

5. The system according to claim 1, wherein
    the first apparatus is a main apparatus, and
    the second apparatus is an expansion apparatus expanding the function of the main apparatus.

6. The system according to claim 1, wherein
    the first apparatus is a computer and the second apparatus is a port replicator for the computer,
    wherein the first surface is a bottom surface of the computer and the second surface is a top surface of the port replicator and is mounted the bottom surface of the computer thereon.

7. The system according to claim 1, wherein
    the second apparatus is a computer and the first apparatus is a port replicator for the computer,
    wherein the second surface is a bottom surface of the computer and the first surface is a top surface of the port replicator and is mounted the bottom surface of the computer thereon.

8. An expansion apparatus detachably attached to a main apparatus, comprising:
    a second surface facing a first surface of the main apparatus when the main apparatus is detachably attached to the expansion apparatus;
    a second connector disposed on the second surface and connected to a first connector on the first surface of the main apparatus; and
    a protrusion fixed into a depression in the first surface of the main apparatus when the main apparatus is attached,
    the depression has a bottom part with a hole through which a screw of assembling the main apparatus is passed, the depression accommodating the head of the screw, and
    wherein the depression has a first length from the first surface to the head of the screw which is accommodated in the depression and assembled the main apparatus, the protrusion has a second length shorter than the first length.

9. The expansion apparatus according to claim 8, wherein
    the depression includes a first depressed part and a second depressed part positioned so as to sandwich the first connector, and
    the protrusion has a first protruding part and a second protruding part positioned so as to sandwich the second connector, the first protruding part fixed into the first depressed part, the second protruding part fixed into the second depressed part.

10. The expansion apparatus according to claim 8, wherein
    the main apparatus is a computer and the expansion apparatus is a port replicator for the computer,
    wherein the first surface is a bottom surface of the computer and the second surface is a top surface of the port replicator and is mounted the bottom surface of the computer thereon.

11. The expansion apparatus according to claim 8, further comprises a circuit board that is accommodated in the expansion apparatus and is secured to the expansion apparatus.

12. The system according to claim 1, wherein the protrusion forms an electrically non-conducting connection with the depression when the first apparatus is attached to the second apparatus.

13. The system according to claim 1, wherein
    the depression includes a first depressed part and a second depressed part,
    the protrusion includes a first protruding part corresponding to the first depressed part and a second protruding part corresponding to the second depressed part, and
    the second apparatus has a width and a depth which an outer of the second apparatus is defined thereby,
    wherein the first protruding part is disposed at a position other than the second protruding part in a width direction of the second apparatus and in a depth direction of the second apparatus.

14. The system according to claim 1, wherein
    the second apparatus has a housing including an upper case and a lower case, and
    the protrusion is a part of the upper case.

15. The system according to claim 1, wherein the protrusion has a pointed end in a protrusion direction of the protrusion.

16. The expansion apparatus according to claim 8, wherein the protrusion forms an electrically non-conducting connection with the depression when the main apparatus is attached to the expansion apparatus.

17. The expansion apparatus according to claim 8, wherein
   the depression includes a first depressed part and a second depressed part,
   the protrusion includes a first protruding part corresponding to the first depressed part and a second protruding part corresponding to the second depressed part, and
   the expansion apparatus has a width and a depth which an outer of the expansion apparatus is defined thereby,
   wherein the first protruding part is disposed at a position other than the second protruding part in a width direction of the expansion apparatus and in a depth direction of the expansion apparatus.

18. The expansion apparatus according to claim 8, wherein
   the expansion apparatus has a housing including an upper case and a lower case, and
   the protrusion is a part of the upper case.

19. The expansion apparatus according to claim 8, wherein the protrusion has a pointed end in a protrusion direction of the protrusion.

\* \* \* \* \*